(12) United States Patent
Strother

(10) Patent No.: US 7,077,470 B1
(45) Date of Patent: Jul. 18, 2006

(54) MOTORCYCLE BACKREST ASSEMBLY

(76) Inventor: Philip Strother, 104 Evergreen Ct., Luling, LA (US) 70070

( * ) Notice: Subject to any disclaimer, the term of this patent is extended or adjusted under 35 U.S.C. 154(b) by 9 days.

(21) Appl. No.: 10/681,661

(22) Filed: Oct. 8, 2003

Related U.S. Application Data

(60) Provisional application No. 60/428,756, filed on Nov. 21, 2002.

(51) Int. Cl.
B62J 1/28 (2006.01)

(52) U.S. Cl. .............................. 297/215.12; 297/195.12

(58) Field of Classification Search ........... 297/215.11, 297/215.12, 195.1, 195.12
See application file for complete search history.

(56) References Cited

U.S. PATENT DOCUMENTS

| 3,822,917 | A | | 7/1974 | George |
| 4,313,639 | A | | 2/1982 | Ware |
| 4,570,998 | A | | 2/1986 | Hughes |
| 4,953,911 | A | * | 9/1990 | Hanagan ................. 297/215.12 |
| D371,529 | S | | 7/1996 | Potter |
| 5,544,937 | A | * | 8/1996 | Hanagan ................. 297/215.12 |
| 6,007,150 | A | * | 12/1999 | Clerkin et al. ......... 297/215.12 |
| 6,224,081 | B1 | | 5/2001 | Wayman et al. |
| 6,422,648 | B1 | * | 7/2002 | Hanagan ................. 297/215.12 |

* cited by examiner

Primary Examiner—Peter R. Brown
(74) Attorney, Agent, or Firm—Kenneth L. Tolar

(57) ABSTRACT

The present invention relates to a backrest, designed particularly for a BMW™ motorcycle, including a mounting bracket configured to conform to and fit between the rear edge of the driver's seat and the front edge of a passenger seat. The mounting bracket includes two ends each having a flange thereon that is secured to the motorcycle chassis with fasteners that typically fasten the passenger seat thereto. A height adjustable, hinged brace member connects a padded backrest to the mounting bracket.

11 Claims, 3 Drawing Sheets

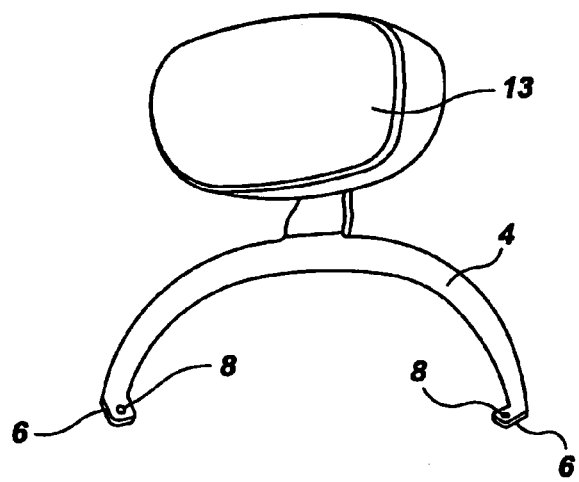
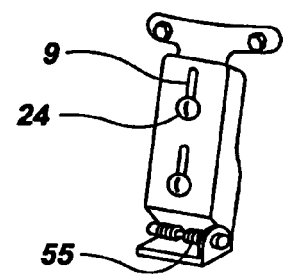
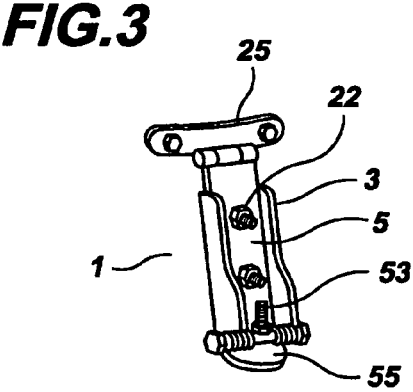
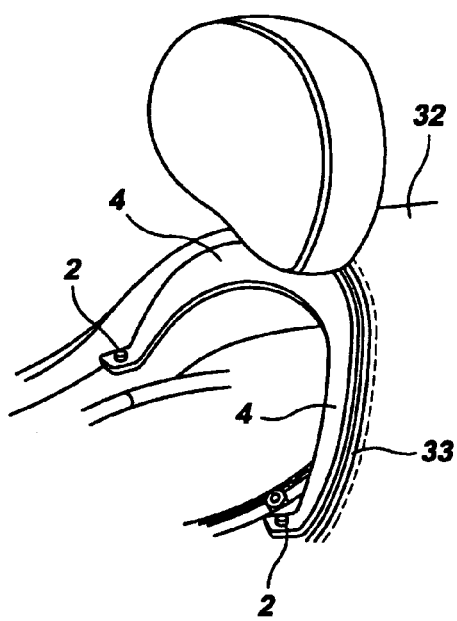
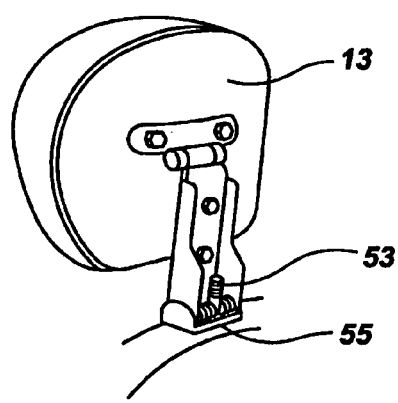

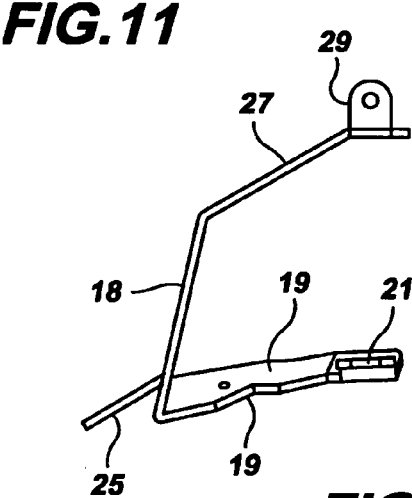
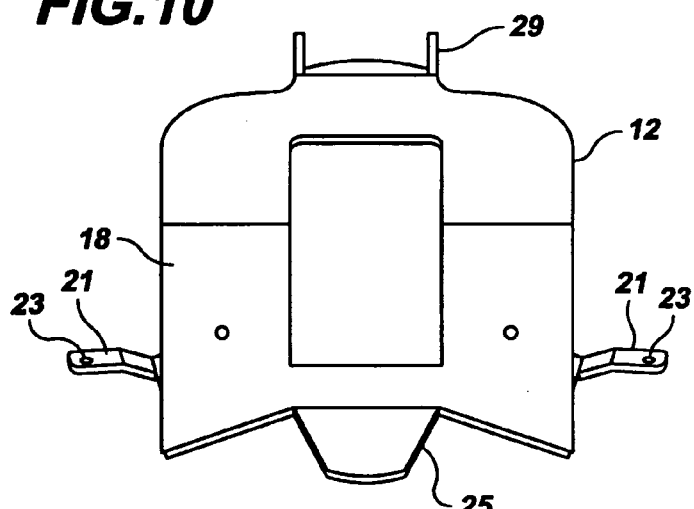
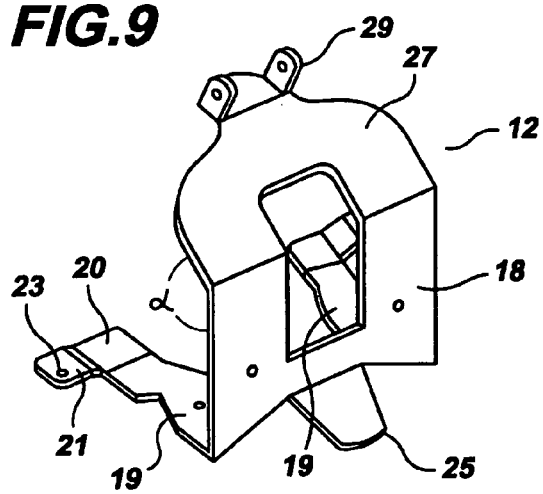

MOTORCYCLE BACKREST ASSEMBLY

CROSS REFERENCE TO RELATED APPLICATIONS

This application is entitled to the benefit of provisional application No. 60/428,756 filed on Nov. 21, 2002.

BACKGROUND OF THE INVENTION

The present invention relates to a backrest for a motorcycle designed particularly for certain BMW™ models.

DESCRIPTION OF THE PRIOR ART

Motorcycles typically include a bench style driver's seat with no backrest. Driving for extended periods of time on such seats can be uncomfortable, and possibly injurious, due to the lack of lower back support.

Various backrests for motorcycles have been heretofore designed to address this problem. For example, U.S. Pat. No. D371,529 issued to Potter discloses an ornamental design for a retrofit motorcycle backrest.

U.S. Pat. No. 6,224,081 issued to Wayman, et al. discloses an adjustable motorcycle backrest attached to a shaft that is positioned inside a torsion spring. The spring prevents the backrest from moving rearwardly.

U.S. Pat. No. 4,570,998 issued to Hughes discloses a motorcycle backrest and passenger seat that is pivotal between a vertical position for use as an operator backrest and a horizontal position for use as a passenger seat.

U.S. Pat. No. 4,313,639 issued to Ware discloses a motorcycle backrest that mounts to the motorcycle seat frame. A cylindrical backrest pad is secured to the outer ends of a pair of support arms, which are in turn pivotally mounted to a frame.

U.S. Pat. No. 3,822,917 issued to George discloses an adjustable backrest for motorcycles that is slidably adjusted between two parallel tracks mounted on the motorcycle frame.

As indicated above, numerous backrests for motorcycles exist in the prior art. However, none are specifically designed for BMW™ models as is the present invention. Accordingly, the present invention includes a uniquely designed, arcuate mounting bracket configured to conform to the rear edge of the driver's seat and the front edge of the passenger seat so as to concealedly fit therebetween. The mounting bracket is contemporaneously mounted to the chassis along with the seat using the existing seat fastener. Alternate embodiments for different model BMW™ motorcycles include varying the contour or configuration of the mounting bracket so as to neatly fit between the passenger and driver seats.

SUMMARY OF THE INVENTION

The present invention relates to a backrest assembly for a motorcycle designed particularly for various BMW™ models such as a K1200 LT, a 1200 CL and an R1100/1150 RT. A first embodiment comprises an arcuate mounting bracket having a select curvature corresponding to the curvature of the rear end of the driver's seat; the bracket terminates at two ends, each end with a flange extending therefrom. Each flange includes an aperture for receiving a screw to fasten the bracket to the motorcycle chassis. The bracket is secured between the front edge of the passenger seat and the rear edge of the driver's seat using screws that typically fasten the passenger seat to the chassis. A hinged, length adjustable brace assembly connects a padded backrest to the mounting bracket. Alternate embodiments include varying the configuration of the mounting bracket to fit between passenger and driver's seats on other models.

It is therefore an object of the present invention to provide a backrest that is specifically designed for a BMW™ motorcycle.

It is another object of the present invention to provide a backrest for a motorcycle that provides lower back support for a motorcycle driver.

It is yet another object of the present invention to provide a backrest for a motorcycle that can be quickly and conveniently installed.

Other objects, features and advantages of the present invention will become readily apparent from the following detailed description of the preferred embodiment when considered with the attached drawings and the appended claims.

BRIEF DESCRIPTION OF THE DRAWINGS

FIG. 1 is a front, perspective view of the backrest assembly according to a first embodiment of the present invention.

FIG. 2 is a front, perspective view of the adjustable hinge assembly.

FIG. 3 is a rear view of the adjustable hinge assembly.

FIG. 4 is a side, perspective view of the first embodiment of the backrest assembly secured to a motorcycle.

FIG. 5 is a rear view of the first embodiment of the backrest assembly.

FIG. 9 is a perspective view of a mounting bracket for a third embodiment according to the present invention.

FIG. 10 is a rear view of the embodiment depicted in FIG. 9.

FIG. 11 is a side view of the embodiment depicted in FIG. 10.

DESCRIPTION OF THE PREFERRED EMBODIMENT

Figure 6:
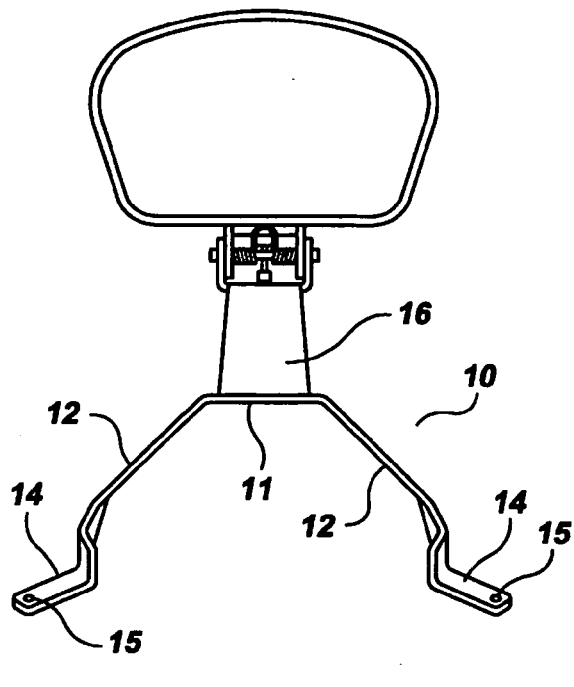
FIG. 6 is a front view of a second embodiment of the present invention.

The present invention relates to a backrest for a motorcycle that is particularly designed for various BMW™ models. Referring specifically now to FIGS. 1 through 5, a first embodiment is depicted for attachment to a BMW™ K1200 LT. A BMW™ K1200 LT motorcycle typically includes a driver's seat (not pictured) that lifts upwardly at a rear end to expose internal components. The rear end of the seat has a select curvature. Immediately behind the driver's seat is a passenger seat 32 having a front end 33 with a select curvature that conforms to the rear end of the driver's seat. The passenger seat is fastened to the chassis with a pair of screws 2.

The backrest according to a first embodiment of the present invention includes an arcuate mounting bracket 4 having two ends, each end having a flange 6 extending therefrom. Each flange includes an aperture 8 for receiving one of the passenger seat screws 2 to simultaneously fasten the bracket and the passenger seat to the motorcycle chassis. The bracket has a select curvature that substantially conforms to both the rear edge of the driver's seat and the front edge of the passenger seat so as to fit neatly and concealedly therebetween.

Now referring specifically to FIGS. 2 and 3, hingedly secured to the top end of the mounting bracket is an adjustable brace member 1. The brace member includes a first outer section 3 that slidably receives a second, inner section 5. The inner section is fastened to the first section with nuts 22 and bolts 24. The bolts are received within elongated, vertical slots 9 provided on at least one of the sections allowing each nut and bolt to be loosened so that the inner and outer sections can be extended and retracted to adjust the length of the brace member.

The top end of the inner section includes a hinged flange 25 that is secured to the rear surface of a padded backrest member 13. The hinged flange allows the backrest member to pivot. Similarly, a mounting flange 55 is pivotally mounted to the lower end of the outer section that fastens the brace assembly to a U-shaped clamp member on an upper portion of the mounting bracket. The flange 55 is spring-biased against an adjustment screw 53 that maintains the backrest in an upright position. The adjustment screw allows a user to adjust the angle of the brace member, and thus the angle of the backrest member, relative to the mounting bracket.

Figure 7:
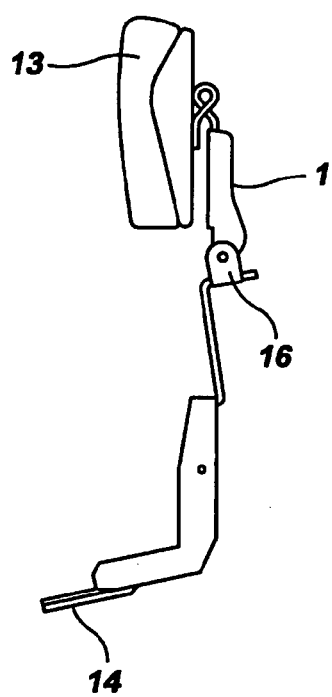
FIG. 7 is a side view of the embodiment depicted in FIG. 6.
Figure 8:
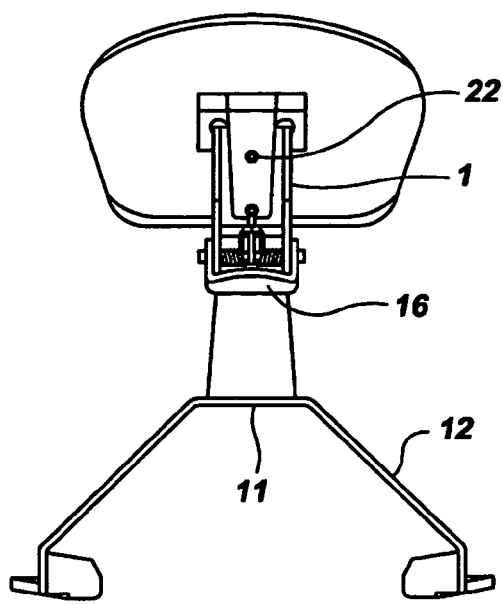
FIG. 8 is a rear view of the embodiment depicted in FIG. 6.

Now referring to FIGS. 6–8, a second embodiment is depicted that is designed for a BMW™ 1200 CL. As with the BMW™ K1200LT, the rear edge of the driver's seat and the front edge of the passenger seat have a select configuration so as to intermesh in a dovetail type fashion. Unlike the 1200LT, however, the contour is more squared as opposed to curved. As such, the mounting bracket, designated generally as 10, includes a horizontal portion 11 with a pair of flared arms 12 angularly depending therefrom. At a distal end of each arm is an outwardly extending flange 14 having an aperture 15 for receiving a screw or similar fastener. The mounting bracket includes an elongated clamp member 16 vertically extending from the horizontal portion to which the height-adjustable brace and padded backrest are attached as described in more detail above.

Now referring specifically to FIGS. 9–11, a third embodiment is depicted for use with a BMW™ R1100/1150 RT. This particular model motorcycle includes a driver's seat that gradually slopes upwardly from the front toward a rear edge. Accordingly, the third embodiment includes a mounting bracket specifically designed to be concealedly mounted between the driver's seat and the passenger seat. The mounting bracket, designated generally as 12, includes a substantially vertical frame member 18 with a pair of opposing planar support legs 19 horizontally extending from a lower edge thereof. Each leg terminates at a distal end 20 having an outwardly extending flange 21 with a fastener receiving aperture 23 thereon. Extending from the lower edge of the frame member on a side opposite the support legs is a tongue 25 that is inserted beneath a cross member positioned under the driver's seat.

Angularly extending from the top edge of the frame member is a backrest support structure 27 to which the padded backrest member is attached. Preferably, the angle α between the frame member and support structure is 125 degrees, though the angle can be varied to suit a particular application. Both the support structure and frame member include a slot 28 for accommodating a seat adjustment mechanism typically installed on a BMW™ R1100/1150 RT. As with the above embodiments, a U-shaped clamp member 29 is attached to a top edge of the support structure to which the adjustable brace member is fastened.

The above described device is not to be limited to the exact details of construction and enumeration of parts described above. Though the device is described as being designed for specific model motorcycles, the backrest assembly according to the present invention can include other variations so as to be easily attachable to other models and makes.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A backrest assembly for a motorcycle, said motorcycle having a chassis with a driver's seat attached thereto, said driver's seat having a rear edge, said motorcycle further including a passenger's seat having a front edge adjacent said driver's seat rear edge, said passenger seat attached to said chassis with a pair of fasteners, said backrest assembly comprising:
    an arcuate mounting bracket having a select curvature that conforms to both the rear edge of the driver's seat and the front edge of the passenger seat, said mounting bracket attached to said chassis;
    a length adjustable brace member attached to said mounting bracket;
    a padded backrest member attached to said brace member.

2. The backrest assembly according to claim 1 wherein said backrest member is hingedly attached to said brace member.

3. The backrest assembly according to claim 2 wherein said brace member comprises:
    a first outer section, said outer section including an elongated slot;
    a second inner section slidably received within said outer section, said inner section having an aperture thereon;
    an attachment means received within said slot and said aperture for adjustably connecting said inner and outer sections.

4. The backrest assembly according to claim 3 further comprising a locking, angular adjustment means for fixing said backrest member at a select angle relative to said brace member.

5. The backrest assembly according to claim 4 wherein said mounting bracket includes a horizontal portion with a pair of arms angularly depending therefrom, each arm terminating at a distal end, each distal end having an aperture thereon, each of said apertures receiving one said fasteners.

6. The backrest assembly according to claim 4 wherein said mounting bracket includes a substantially vertical frame member with a pair of opposing planar support legs horizontally extending from a lower edge thereof, each of said legs terminating at a distal end, each distal end having an aperture thereon, each aperture receiving one of said fasteners, said frame member further including a top edge with a backrest support structure angularly extending therefrom, said backrest member attached to said backrest support structure.

7. The motorcycle backrest according to claim 6 wherein said support structure and said frame member both include a slot for accommodating a seat adjustment mechanism on said motorcycle.

8. The backrest assembly according to claim 4 wherein said locking, angular adjustment means comprises a spring biased mounting flange secured to a lower end of said brace member outer section, said mounting flange fastened to said mounting bracket;

an adjustment screw adjustably engaging said spring biased flange to lock said brace member at a select angle.

9. The motorcycle backrest according to claim 1 wherein said mounting bracket has two ends, each of said ends having a flange extending therefrom, each flange including an aperture for receiving one of said pair of fasteners that secure said passenger seat to simultaneously fasten the bracket and the passenger seat to the motorcycle chassis.

10. A backrest assembly for a motorcycle, said motorcycle having a chassis with a driver's seat attached thereto, said driver's seat having a rear edge, said motorcycle further including a passenger's seat having a front edge adjacent said driver's seat rear edge, said passenger seat attached to said chassis with a pair of fasteners, said backrest assembly comprising:

a mounting bracket contoured and dimensioned to concealedly fit between the rear edge of said driver's seat and the front edge of said passenger seat, said mounting bracket attached to said chassis with said fasteners;

a length adjustable brace member attached to said mounting bracket, said brace member including a first outer section, said outer section including an elongated slot, a second inner section slidably received within said outer section, said inner section having an aperture thereon, an attachment means received within said slot and said aperture for adjustably connecting said inner and outer sections;

a padded backrest member hingedly attached to said brace member;

a locking, angular adjustment means for fixing said backrest member at a select angle relative to said brace member, said locking, angular adjustment means including a spring-biased mounting flange secured to a lower end of said brace member outer section, said mounting flange fastened to said mounting bracket, an adjustment screw adjustably engaging said spring-biased flange to lock said brace member at a select angle.

11. The backrest assembly according to claim 10 wherein said bracket has a select curvature, said curvature corresponding to an arcuate contour of the rear edge of the driver's seat and the front edge of said passenger seat.

* * * * *